United States Patent
Ramos

(10) Patent No.: US 10,890,005 B2
(45) Date of Patent: Jan. 12, 2021

(54) ALERT-ENABLED SKIMMER BASKET

(71) Applicant: Arturo Ramos, Union City, CA (US)

(72) Inventor: Arturo Ramos, Union City, CA (US)

(*) Notice: Subject to any disclaimer, the term of this patent is extended or adjusted under 35 U.S.C. 154(b) by 0 days.

(21) Appl. No.: 16/372,016

(22) Filed: Apr. 1, 2019

(65) Prior Publication Data
US 2020/0308856 A1 Oct. 1, 2020

(51) Int. Cl.
*E04H 4/12* (2006.01)
*B01D 35/14* (2006.01)
*B01D 35/143* (2006.01)

(52) U.S. Cl.
CPC ......... *E04H 4/1272* (2013.01); *B01D 35/143* (2013.01)

(58) Field of Classification Search
CPC ............................ E04H 4/1272; B01D 35/143
USPC .............................. 210/167.1, 167.19, 167.2
See application file for complete search history.

(56) References Cited

U.S. PATENT DOCUMENTS

| | | | | |
|---|---|---|---|---|
| 5,888,386 A | * | 3/1999 | Enright | C02F 1/688 210/167.11 |
| 2012/0006730 A1 | * | 1/2012 | Tesauro | B01D 29/35 210/87 |
| 2018/0147507 A1 | * | 5/2018 | Angelino | B01D 29/35 |

* cited by examiner

*Primary Examiner* — Fred Prince
(74) *Attorney, Agent, or Firm* — Lamon Patent Services, Inc.; Cynthia S. Lamon

(57) ABSTRACT

A skimmer basket assembly has an basket, a circular platform with a magnetically permeable ring supported on a spring, a guide tube having a lowermost end of the guide tube positioned above an uppermost position of the circular platform, and a flag assembly within the guide tube, the flag assembly having a central stem, a flag at an uppermost end, a magnetic tip at a lowermost end, and a float. With the skimmer basket in a housing, with water flowing through, and the circular platform at an uppermost position, the flag assembly is held to the ring, and, with debris collected in the basket, increased force compresses the spring, separating the flag assembly, allowing the flag mechanism to float upward as an alert that there is debris in the skimmer basket.

18 Claims, 5 Drawing Sheets

ALERT-ENABLED SKIMMER BASKET

BACKGROUND OF THE INVENTION

1. Field of the Invention

The present invention is in the technical area of pool and spa equipment, and related more specifically to a skimmer basket that presents and alert when becoming clogged with debris.

2. Description of Related Art

Pool and spa skimmers are well-known in the art, and comprise generally perforated basket that resides in a flow channel where water from a pool or a hot tub, for example, may be diverted to flow through the basket. a purpose is to catch leaves, hair and other debris, which may then be removed by removing the basket from the position in the diverted flow, emptying the basket, and placing it again in position to catch more debris.

In the conventional art one must check the basket regularly to know when to empty the debris, and checking usually means removing the basket and replacing it even if it does not need to be emptied.

What is clearly needed is a skimmer basket that senses when debris has built up in the basket, and that issues an alert.

BRIEF SUMMARY OF THE INVENTION

In one embodiment of the invention a skimmer basket assembly is provided, comprising an outer perforated cylindrical basket, an inner, vertically-translatable, circular platform supported on a spring mechanism above a bottom of the basket, having a magnetically-permeable ring proximate an outer periphery of the circular platform, a guide tube affixed to an inner wall of the cylindrical basket, having a lowermost end of the guide tube positioned above an uppermost position of the circular platform, and a flag assembly within the guide tube, the flag assembly comprising a central stem, a flag at an uppermost end of the stem, a magnetic tip at a lowermost end of the stem, and a float affixed to the stem at a position between the magnetic tip and the flag. With the skimmer basket placed in a skimmer housing, with water flowing through the housing and the skimmer basket, and the circular platform at an uppermost position, the magnetic tip of the flag assembly contacts the magnetically permeable ring, and retains the flag assembly submerged in the guide tube, and wherein, with debris collected in the skimmer basket, increased force from water passing through the basket compresses the spring mechanism, separating the magnetic tip from the magnetically-permeable ring, allowing the flag mechanism to float upward, as an alert that there is debris in the skimmer basket.

In one embodiment the outer, perforated cylindrical basket is molded from a polymer material. also, in one embodiment the magnetically permeable ring has a protective cover preventing the ring from oxidation. In one embodiment the magnetically permeable ring is a polymer material with embedded permeable material. And in one embodiment the translatable circular platform is affixed to a bushing having a vertical axis, with the bushing engaging a vertical stem, such that the platform is guided on the stem.

In one embodiment the spring mechanism is a compression spring spacing the platform above the bottom of the basket. Also, in one embodiment the assembly further comprises spring retainers on the bottom of the outer perforated cylindrical basket, and on an underside of the circular platform, retaining the compression spring. In one embodiment the outer ring of the platform is magnetic, and the tip of the flag assembly is of magnetically permeable material. And in one embodiment the flag assembly, with the circular platform at an uppermost position, rests by the float on a shoulder of the guide tube.

In another aspect of the invention a method for alerting a user to debris in a skimmer is provided, comprising mounting a vertically-translatable circular platform having a ring of magnetically permeable material near an outer periphery of the platform on a spring mechanism above a bottom surface of a perforated cylindrical basket, affixing a guide tube to an inner wall of the perforated cylindrical basket with a lowermost end above an uppermost position of the circular platform, placing a flag mechanism having a flag on an uppermost end, a magnetic tip on a lowermost end, and a float between the uppermost and the lowermost ends, in the guide tube, such that the magnetic tip is held to the magnetically permeable ring, placing the basket with the flag assembly and circular platform in a skimmer housing with water flowing through the basket, and allowing the basket to collect debris from the water flow, to the point that the debris causes a pressure compressing the spring mechanism, disconnecting the magnetic tip from the magnetically permeable ring, releasing the flag mechanism to float upward as an alert that there is debris in the basket.

In one embodiment the method comprises molding the outer, perforated cylindrical basket from a polymer material. also, in one embodiment the method comprises adding a protective cover to the magnetically permeable ring, preventing the ring from oxidation. Also, in one embodiment the method comprises making the magnetically permeable ring from a polymer material with embedded permeable material. In one embodiment the method comprises affixing the translatable circular platform to a bushing having a vertical axis, with the bushing engaging a vertical stem, such that the platform is guided on the stem.

In one embodiment the method comprises forming the spring mechanism as a compression spring spacing the platform above the bottom of the basket. In one embodiment the method comprises placing spring retainers on the bottom of the outer perforated cylindrical basket, and on an underside of the circular platform, retaining the compression spring. In one embodiment the method comprises making the outer ring of the platform magnetic, and the tip of the flag assembly magnetically permeable material. And in one embodiment the method comprises providing a shoulder in the guide tube for resting the flag assembly, with the circular platform at an uppermost position, by the float.

DETAILED DESCRIPTION OF THE INVENTION

Figure 1:
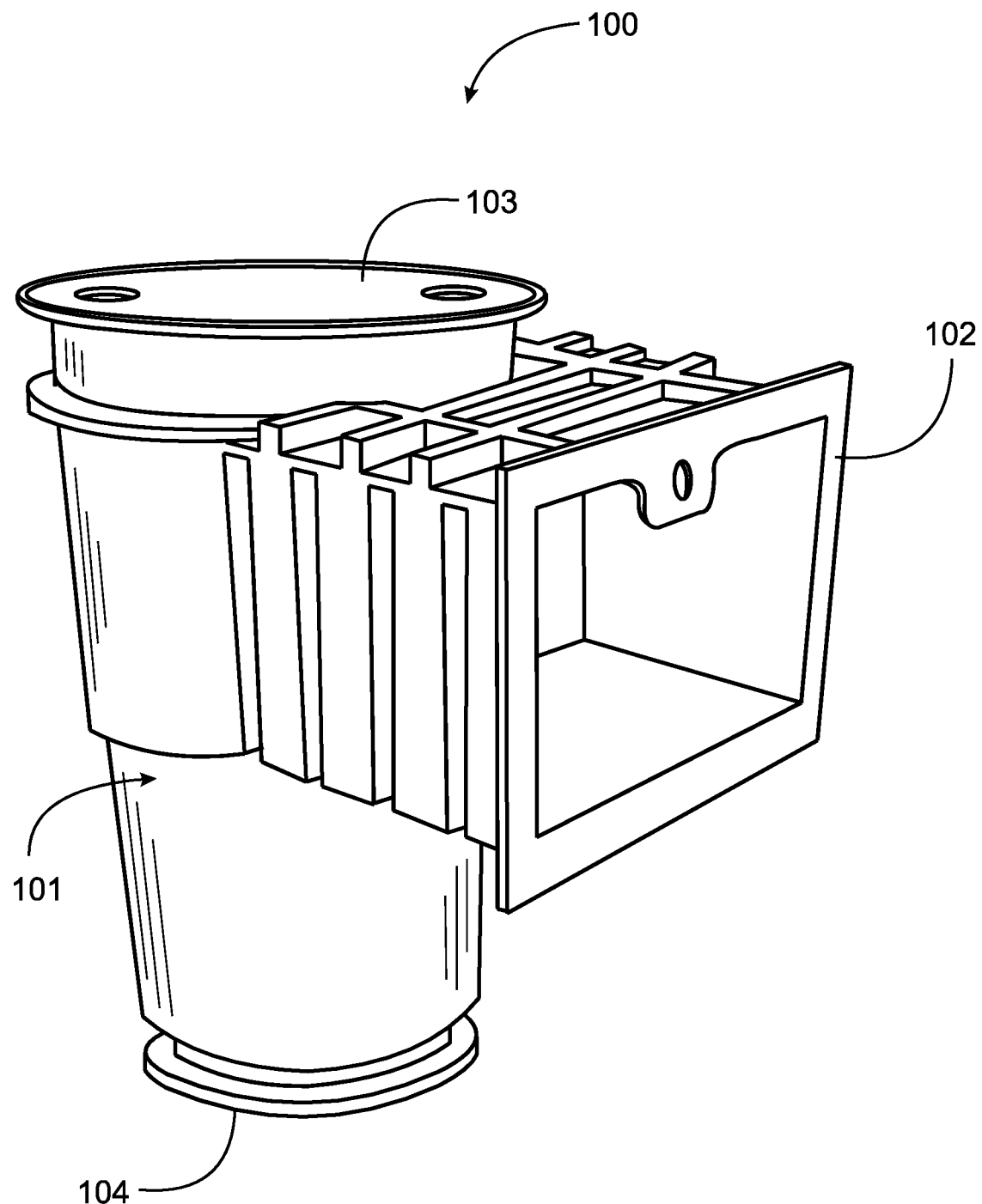
FIG. 1 is a perspective view of a skimmer housing useful in holding a skimmer basket in a flow of water from a pool or a spa in an embodiment of the present invention.

FIG. 1 is a perspective view of a skimmer housing 100 useful in holding a skimmer basket in a flow of water from a pool or a spa in an embodiment of the present invention. Housing 100 has a body 101 within which an especially configured skimmer basket, described more fully below, may be placed to separate debris from water flowing through the housing and the basket. Skimmer basket includes a basket top 103 and a intake interface 102. Water is drawn into housing 100, through body 101 and through the basket, not shown in FIG. 1, by a powerful pump that creates suction by drawing water from the housing at an exit flange 104. The skilled person will understand that this particular housing is but one design of several that may be used in various pools and spas.

Figure 2:
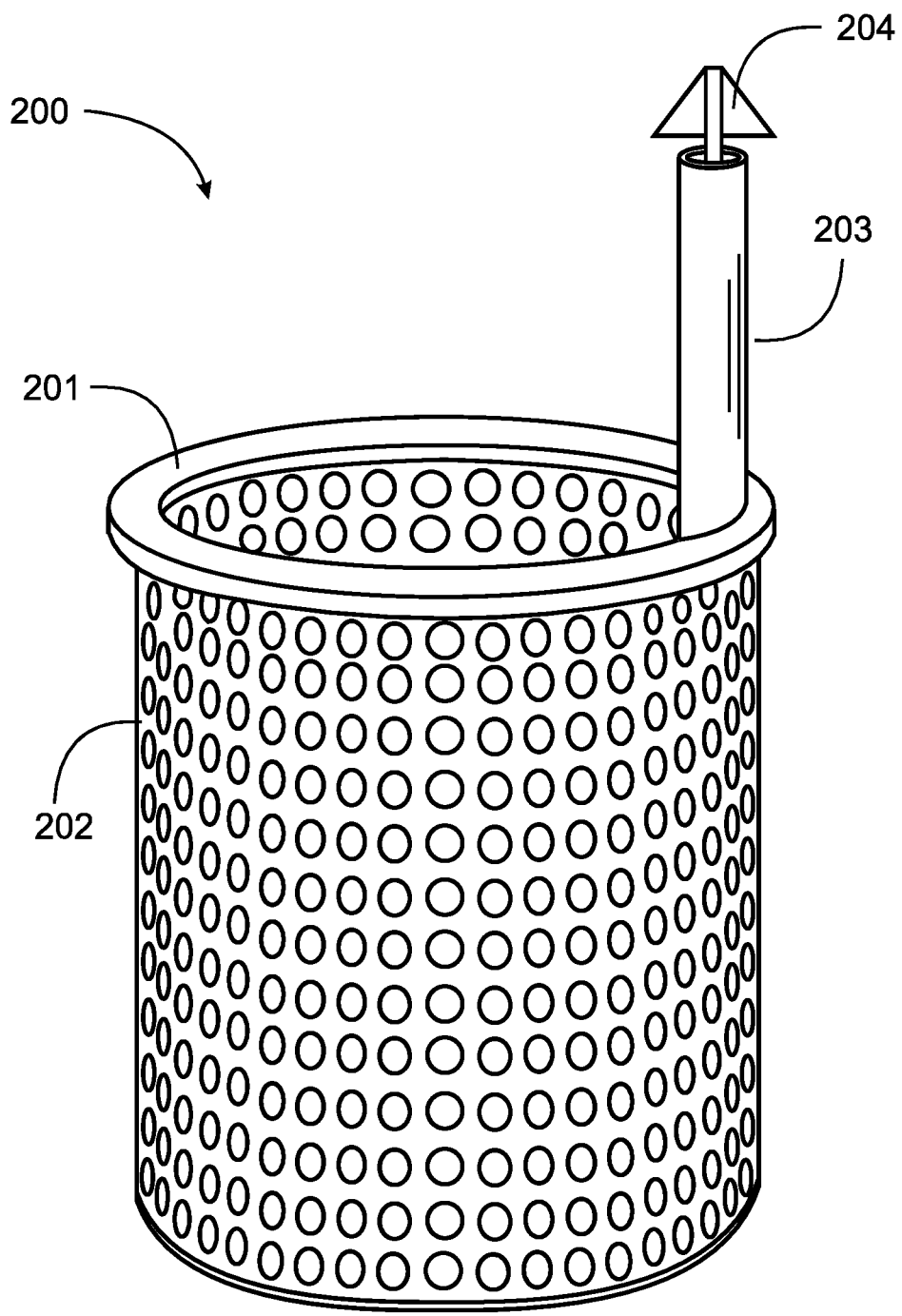
FIG. 2 is a perspective view of an alert-enabled skimmer basket in an embodiment of the present invention.

FIG. 2 is a perspective view of an alert-enabled skimmer basket 200 in an embodiment of the present invention. FIG. 2 is an external view that does not show internal elements and mechanisms that function together to accomplish important purposes of the basket in embodiments of the invention. These mechanisms and elements are described below with reference to FIGS. 3 and 4.

FIG. 2 illustrates basket 200 with an upper rim 201 and a perforated body 202. Body 201 has a dense pattern of openings through sides and bottom, to provide relatively free flow of water through the basket. It will be apparent that the nature and pattern of openings through body 202 may take any one of a variety of characteristics, which may be molded into the body or provides in other ways. A guide tube 203 houses and guides a vertically-translatable flag assembly topped by a flag 204. Internal mechanisms not shown release the flag assembly too translate upward as an alert to a user, when debris in the basket reaches a certain density.

Figure 3:
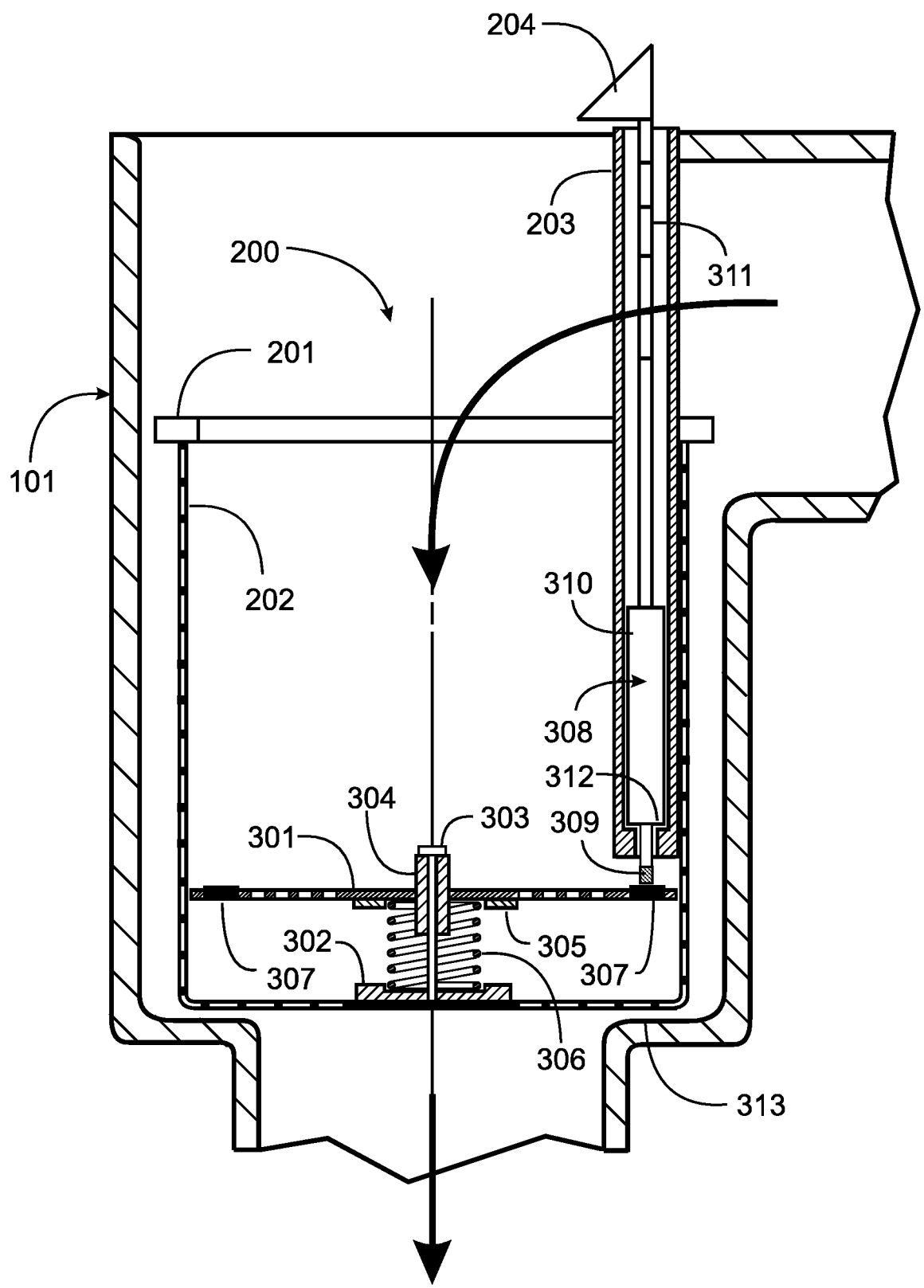
FIG. 3 is a section view through the skimmer basket of FIG. 2, illustrating internal elements and mechanisms in a state that the basket is configured to react, but is not clogged with debris.

FIG. 3 is a section view through the skimmer basket of FIG. 2, illustrating internal elements and mechanisms in a state that the basket is configured to react, but is not clogged with debris. Perforated body 202 has a spring retainer 302 mounted on bottom of the basket, which anchors a vertical guide rod 303 upon which a guide bushing 304 is constrained to translate vertically. A perforated inner translatable platform 301 is rigidly mounted to bushing 304, and travels vertically with the bushing. The bushing acts to keep the translatable platform horizontal in operation.

Platform 301 has a magnetically-permeable metal ring 307, which may be iron, but is preferably made of an alloy that is less prone to oxidation, mounted near an outer periphery of the platform. In some embodiments ring 307 has a protective covering or layer that prevents the metal ring from oxidizing. In some embodiments the ring may be a molded polymer material with magnetically-permeable material embedded in the polymer.

Platform 301 has a spring retainer 305 mounted centrally on the underside, and rests on a compression spring 306, constrained by retainers 302 and 305, surrounding guide rod 303. Spring 306 spaces translatable platform 301 from the bottom of body 202, and platform 301 is guided on guide rod 303 by bushing 304. The vertical position of platform 301 depends on amount of compression of spring 306.

Flow of water through housing 101 and basket 200 is shown in FIG. 3 by heavy arrows. In operation, with a clean basket, the flow of water is insufficient to cause significant compression of spring 306, so platform 301 maintains a stable elevation as shown in FIG. 3.

Figure 5:
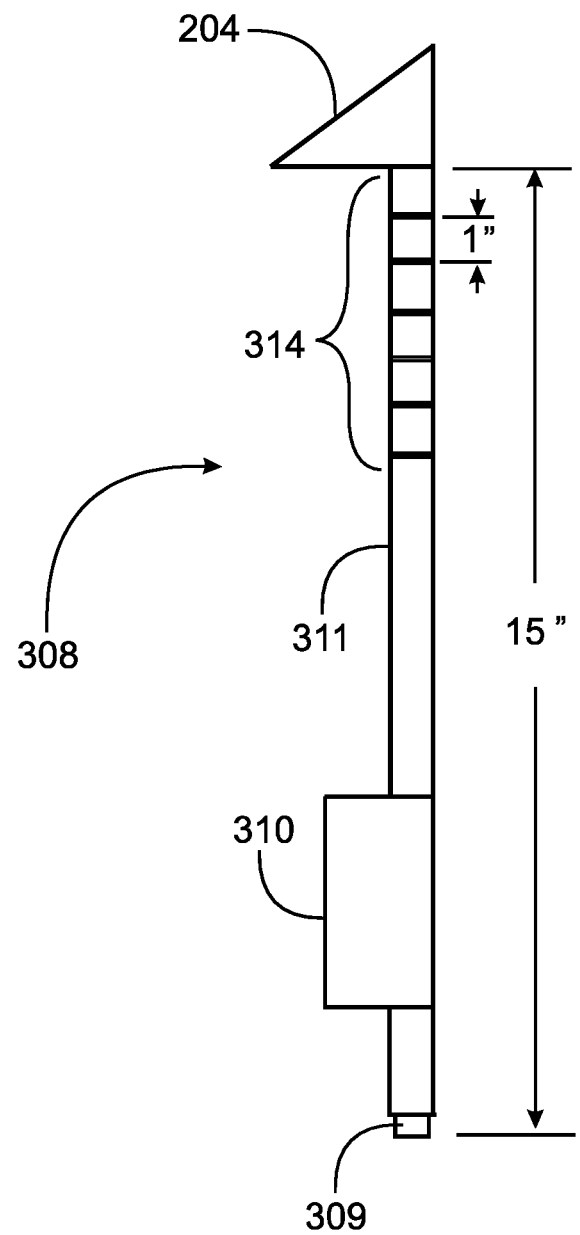
FIG. 5 is a perspective view of a flag insert for the skimmer basket.

A guide tube 203 for a flag assembly 308 is affixed to one inside wall of basket 200 for a length such that a bottom of the tube is positioned just a short distance from an upper surface of the platform as shown in FIG. 3. Flag assembly 308 is shown in additional detail in FIG. 5. Flag assembly 308 comprises a central stem 311, a float 310, a flag 204 at an uppermost end, and a magnet 309 at a lowermost tip of stem 311. Shallow cuts in an uppermost six-inch region 314 are spaced on one-inch intervals, which serve as an aid in aligning the flag assembly at initial installation so the flag itself may be level with the lid when the basket is empty, and may creep up as the basket fills.

With flag assembly 308 inserted in guide tube 203, float 310 rests on a shoulder 312 of tube 203, and magnet 309 in this circumstance contacts magnetically-permeable ring 307 in platform 301. Flag assembly 308 is thus held submerged in operation, with basket 200 resting on shoulder 313, until and unless platform 301 assumes a lower position relative to body 202 than shown in FIG. 3.

Figure 4:
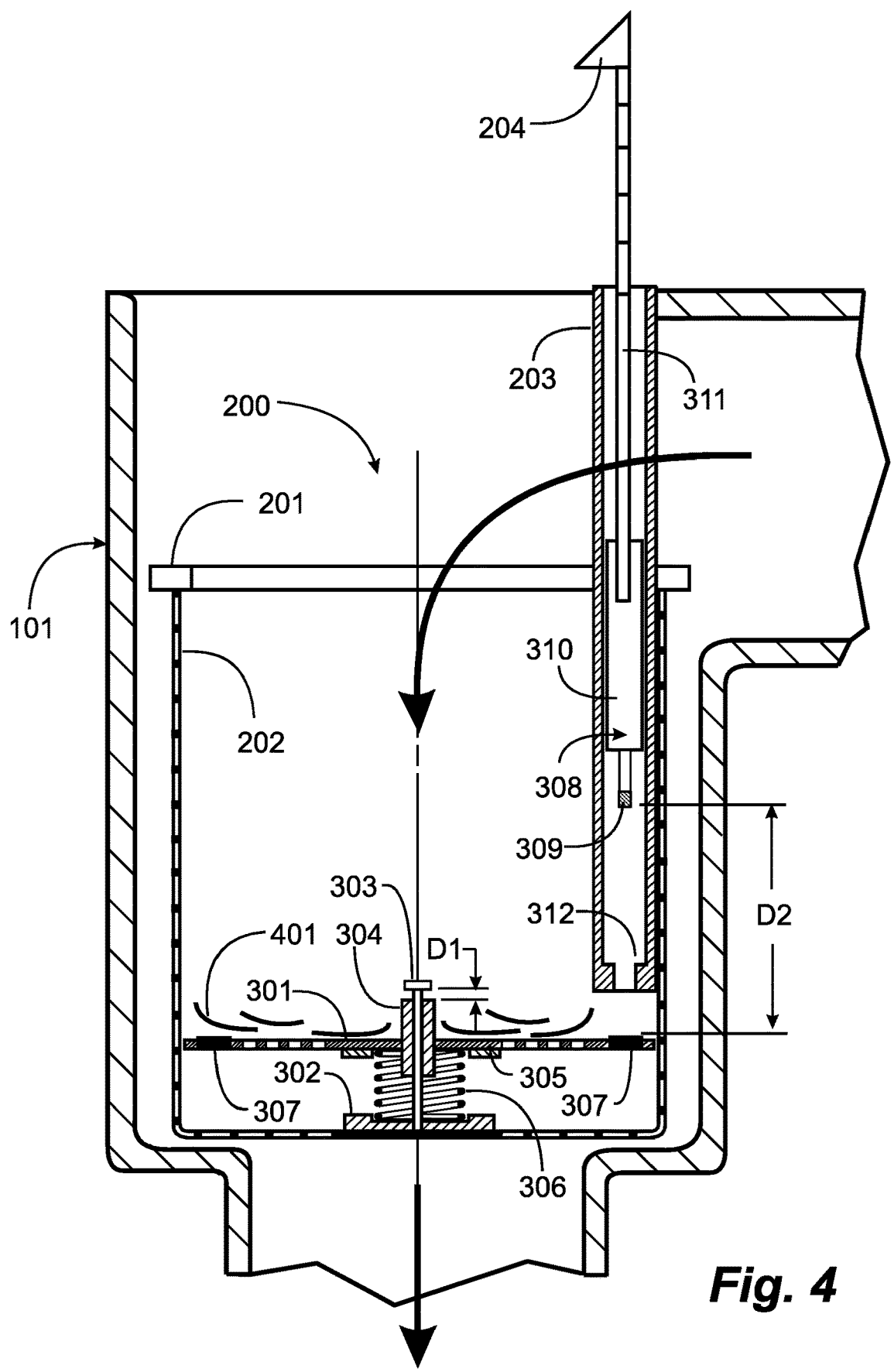
FIG. 4 is a section view similar to that of FIG. 3, but with the basket sensing debris, and having raised an alert flag that the basket needs emptied, in an embodiment of the invention.

FIG. 4 is a section view similar to that of FIG. 3, but with the basket sensing debris, indicated as elements 401, and having raised the flag as an alert that the basket needs emptied, in an embodiment of the invention. Debris elements 401 may be leaves, paper, human or animal hair, or any other material the basket is intended to collect.

As described above, with no debris in the basket, the normal flow of water through the basket is insufficient to cause any significant compression of spring 306. A sufficient quantity of leaves or other debris, however, plugs openings through the basket, and causes a significant pressure differential across the basket, such that a downward force is created that causes a relative compression of spring 306. The more debris collected, the greater the force, and the greater the deflection.

In the view of FIG. 4 collection of debris has caused spring 306 to compress a distance D1, which has separated magnet tip 309 from permeable ring 307, and has released flag assembly 308, which has, by virtue of float 310, floated upward a dimension D2, in which position flag 204 is raised substantially above a top of housing 101, providing a visual signal to a user to remove basket 200 and empty and clean the basket of the collected debris. After cleaning, basket 200 may be replaced in housing 101 with flag assembly 308 again constrained to permeable ring 307 of platform 301 by magnetic tip 309, until sufficiently more debris is collected to again depress platform 301 against spring 306 to release flag assembly 308.

The inventor understands that there may be, in different skimmer systems, pumps of different horsepower and capacity, such that the flow of water through the basket will be different for different systems, which will vary the force produced on the spring-supported skimmer basket, both in a clean condition, and with debris in the basket. Accordingly, a default spring is used in most embodiments that has a sufficient spring-rate vs force, that the spring will not depress significantly below about one pound force. The inventor believes a spring of this characteristic will serve a majority of existing skimmer systems. To be completely flexible, springs of other spring rate are made available, and may be switched in, for systems with pumps that create conditions outside the capability of the default spring.

The skilled person will understand that the figures and description provided above for embodiments of the invention are exemplary only, and that many alterations to the various elements and the interaction of elements might be made within the scope of the invention. The scope of the invention is limited only by the claims below.

I claim:

1. A skimmer basket assembly, comprising:
    an outer perforated cylindrical basket;
    an inner, vertically-translatable, circular platform supported on a spring mechanism above a bottom of the basket, having a magnetically-permeable ring proximate an outer periphery of the circular platform;
    a guide tube affixed to an inner wall of the cylindrical basket, having a lowermost end of the guide tube positioned above an uppermost position of the circular platform; and
    a flag assembly within the guide tube, the flag assembly comprising a central stem, a flag at an uppermost end of the stem, a magnetic tip at a lowermost end of the stem, and a float affixed to the stem at a position between the magnetic tip and the flag;
    wherein, with the cylindrical basket placed in a skimmer housing, with water flowing through the housing and the cylindrical basket, and the circular platform at an uppermost position, the magnetic tip of the flag assembly contacts the magnetically permeable ring, and retains the flag assembly submerged in the guide tube, and wherein, with debris collected in the cylindrical basket, increased force from water passing through the basket compresses the spring mechanism, separating the magnetic tip from the magnetically-permeable ring, allowing the flag mechanism to float upward, as an alert that there is debris in the skimmer basket.

2. The skimmer basket assembly of claim 1 wherein the outer, perforated cylindrical basket is molded from a polymer material.

3. The skimmer basket assembly of claim 1 wherein the magnetically permeable ring has a protective cover preventing the ring from oxidation.

4. The skimmer basket assembly of claim 1 wherein the magnetically permeable ring is a polymer material with embedded permeable material.

5. The skimmer basket assembly of claim 1 wherein the translatable circular platform is affixed to a bushing having a vertical axis, with the bushing engaging a vertical stem, such that the platform is guided on the stem.

6. The skimmer basket assembly of claim 1 wherein the spring mechanism is a compression spring spacing the platform above the bottom of the basket.

7. The skimmer basket assembly of claim 6 further comprising spring retainers on the bottom of the outer perforated cylindrical basket, and on an underside of the circular platform, retaining the compression spring.

8. The skimmer basket assembly of claim 1 wherein the outer ring of the platform is magnetic, and the tip of the flag assembly is of magnetically permeable material.

9. The skimmer basket assembly of claim 1 wherein the flag assembly, with the circular platform at an uppermost position, rests by the float on a shoulder of the guide tube.

10. A method for alerting a user to debris in a skimmer, comprising:
    mounting a vertically-translatable circular platform having a ring of magnetically permeable material near an outer periphery of the platform on a spring mechanism above a bottom surface of a perforated cylindrical basket;
    affixing a guide tube to an inner wall of the perforated cylindrical basket with a lowermost end above an uppermost position of the circular platform;
    placing a flag assembly having a flag on an uppermost end, a magnetic tip on a lowermost end, and a float between the uppermost and the lowermost ends, in the guide tube, such that the magnetic tip is held to the magnetically permeable ring;
    placing the basket with the flag assembly and circular platform in a skimmer housing with water flowing through the basket; and
    allowing the basket to collect debris from the water flow, to the point that the debris causes a pressure compressing the spring mechanism, disconnecting the magnetic tip from the magnetically permeable ring, releasing the flag mechanism to float upward as an alert that there is debris in the basket.

11. The method of claim 10 comprising molding the perforated cylindrical basket from a polymer material.

12. The method of claim 10 comprising adding a protective cover to the magnetically permeable ring, preventing the ring from oxidation.

13. The method of claim 10 comprising making the magnetically permeable ring from a polymer material with embedded permeable material.

14. The method of claim 10 comprising affixing the translatable circular platform to a bushing having a vertical axis, with the bushing engaging a vertical stem, such that the platform is guided on the stem.

15. The method of claim 10 comprising forming the spring mechanism as a compression spring spacing the platform above the bottom of the basket.

16. The method of claim 10 further comprising placing spring retainers on the bottom of the perforated cylindrical basket, and on an underside of the circular platform, retaining the compression spring.

17. The method of claim 10 comprising making the outer ring of the platform magnetic, and the tip of the flag assembly magnetically permeable material.

18. The method of claim 10 comprising providing a shoulder in the guide tube for resting the flag assembly, with the circular platform at an uppermost position, by the float.

* * * * *